United States Patent [19]

Kato et al.

[11] Patent Number: 4,464,023

[45] Date of Patent: Aug. 7, 1984

[54] LARGE RELATIVE APERTURE OBJECTIVE

[75] Inventors: Masatake Kato, Tokyo; Shigeru Hashimoto, Kanagawa, both of Japan

[73] Assignee: Canon Kabushiki Kaisha, Tokyo, Japan

[21] Appl. No.: 298,335

[22] Filed: Aug. 31, 1981

[30] Foreign Application Priority Data

Sep. 4, 1980 [JP] Japan ................................. 55-122859

[51] Int. Cl.³ .......................... G02B 9/62; G02B 15/18
[52] U.S. Cl. .................................... 350/464; 350/431; 350/450
[58] Field of Search ......................... 350/464, 431, 450

[56] References Cited

FOREIGN PATENT DOCUMENTS

37445  3/1977  Japan ................................. 350/431

Primary Examiner—John K. Corbin
Assistant Examiner—Rebecca D. Gass
Attorney, Agent, or Firm—Toren, McGeady and Stanger

[57] ABSTRACT

An objective lens of large relative aperture comprising, from front to rear, a first lens component of positive power, a second lens component of positive power and a third lens component of negative power, the first and third lens components being moved forward as a unit, while the second lens component is simultaneously moved forward by a smaller amount than that of the movement of them to effect focusing from infinity to shorter object distances. The focal lengths of the first, second and third lens components, the calculations of the constituent lenses, and the glass materials of which the lenses are made up are properly chosen so as to achieve a high grade imaging performance throughout a focusing range from infinity to very short object distances.

2 Claims, 30 Drawing Figures

FIG. 1a

DIAPHRAGM

FIG. 1b

DIAPHRAGM

FIG.2a

DIAPHRAGM

FIG.2b

DIAPHRAGM

FIG.3a

DIAPHRAGM

FIG.3b

DIAPHRAGM

LARGE RELATIVE APERTURE OBJECTIVE

BACKGROUND OF THE INVENTION

1. Field of the Invention

This invention relates to objective lenses of large relative aperture which are capable of high grade imaging performance throughout a focusing range from infinity to extremely short object distances.

2. Description of the Prior Art

The general-purpose photographic objectives are corrected for aberrations so as to provide the best optical performance usually to an infinitely distant object. On the other hand, the macro objectives which aim principally at close up photography has to take account the fact that the aberrations vary with the object distance. In general, the reproduction ratio of 1:10 or thereabout is selected as the starting point of design for which the best optical performance is obtained. In many cases, however, when it comes to large relative aperture objectives, or wide angle objectives, as the image magnification increases, the range of variation of the aberrations is increased. In particular, the spherical aberration and asymmetrical aberrations of extra-axial rays of light are deteriorated extremely badly. This is because the paraxial pencil from a close object tends to diverge more strongly than that from the infinitely distance object so that it is near the stop that the paraxial pencil transits to divergence. Therefore, the spherical aberration of the positive lens group that follows the stop becomes insufficient to compensate for that. Also, since the principal ray of the extra-axial pencil makes a smaller angle with the optical axis, when focusing is effected down to shorter object distances, outward coma is often caused to be produced. Such large variation of the aberrations with the differing reproduction ratios makes it meaningless to optimize the aberration correction at the reproduction ratio of 1/10 or thereabout when the objective is focused on either the infinitely distant object or the extremely close object for which the sufficiently good optical performance is no longer preserved. Particularly in close up photography, it is at a reproduction ratio of about 1/5 that variation of the aberrations begins to increase, causing the imaging performance to be lowered. In order to prevent such loss in the imaging performance due to the change of the reproduction ratio, it has been the common practice in the art to impart a floating movement into part of the optical system. With respect to this type of objective, mention may be made of U.S. Pat. No. 3,884,557, and Japanese Laid Open Pat. No. Sho 50-138823 and No. 53-87728.

SUMMARY OF THE INVENTION

The present invention is directed particularly toward the prevention of the loss in aberration correction due to the change of the image magnification by making part of the lens system able to float. Since the conventional floating method is complicated and incapable of providing a much-desired increase in the floating amount and permits the interval between the principal points of the lens groups to be so widened by the floating that focal length varies to a large extent, it is an object of the present invention to provide a novel floating method which has overcome all the above-mentioned drawbacks of the conventional one.

It is a further object of the invention to provide an objective lens of large relative aperture which is well corrected for high grade imaging performance throughout an extended focusing range.

The floating method of the invention is characterized in that, since the objective lens has, from front to rear, a first lens component of positive power, a second lens component of positive power and a third lens component of negative power, when focusing is effected down from infinity to shorter object distances, the first and third lens components are moved axially forwards, while the second lens component is simultaneously moved axially forward by a smaller amount than that of movement of the first and third lens components.

BRIEF DESCRIPTION OF THE DRAWINGS

FIGS. 1-a, 2-a and 3-a are lens block diagrams of embodiments 1, 2 and 3 of the invention with object at infinity respectively.

FIGS. 1-b, 2-b and 3-b are lens block diagrams of embodiments 1 to 3 when focused to a reproduction ratio of ½ respectively.

FIGS. 4-a, b, c, d and 5-a, b, c, d are graphic representations of the various aberrations of embodiment 1 with object at infinity and at a reproduction ratio of ½ (where the air separations D6 and D11 are taken at D6=0.1433 and D11=0.0072) respectively.

FIGS. 6-a, b, c, d and 7-a, b, c, d are graphic representations of the various aberrations of embodiment 2 with object at infinity and at a reproduction ratio of ½ (where the air separations D6 and D11 are taken at D6=0.2162 and D11=0.0077) respectively.

FIGS. 8-a, b, c, d and 9-a, b, c, d are graphic representations of the various aberrations of embodiment 3 with object at infinity and at a reproduction ratio of ½ (where the air separations D6 and D11 are taken at D6=0.1628 and D11=0.0109) respectively.

DETAILED DESCRIPTION OF THE PREFERRED EMBODIMENTS

Figure 1A:
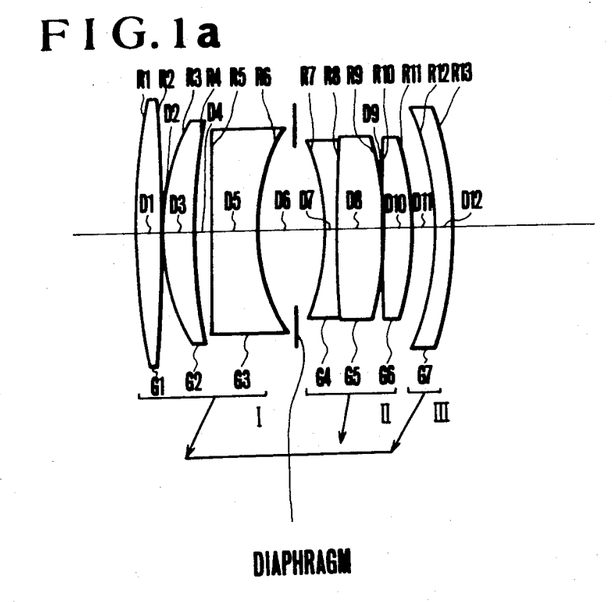
Figure 1B:
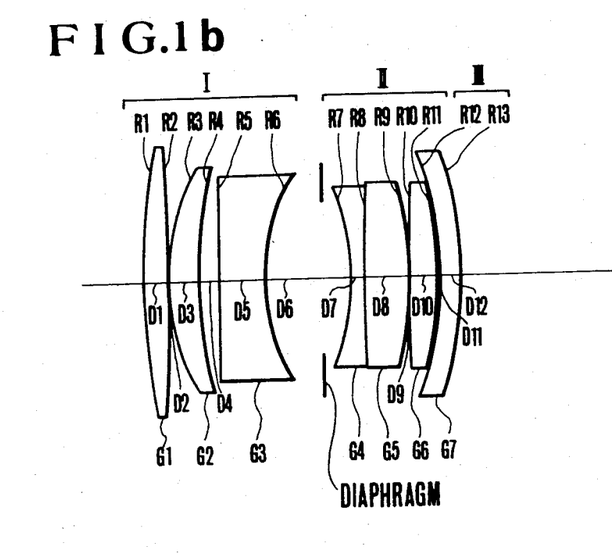
Figure 2A:
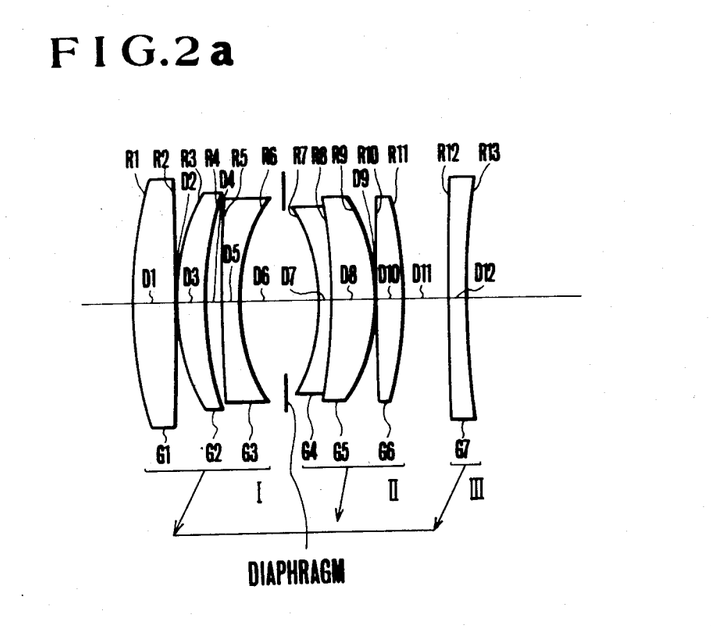
Figure 2B:
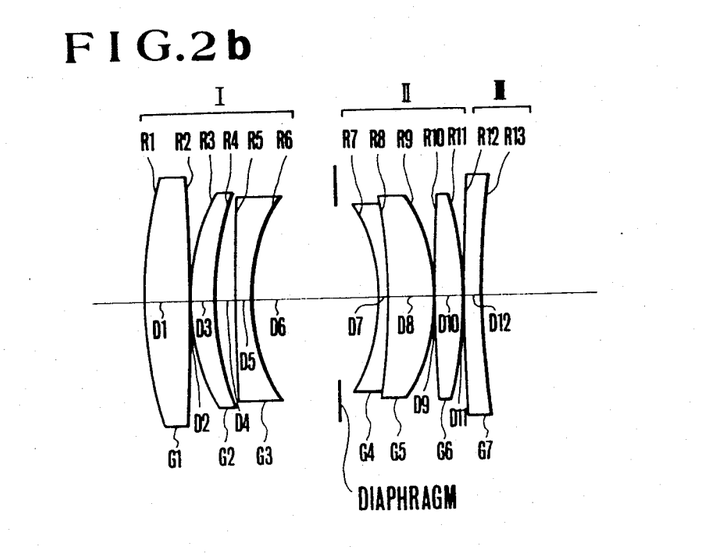
Figure 3A:
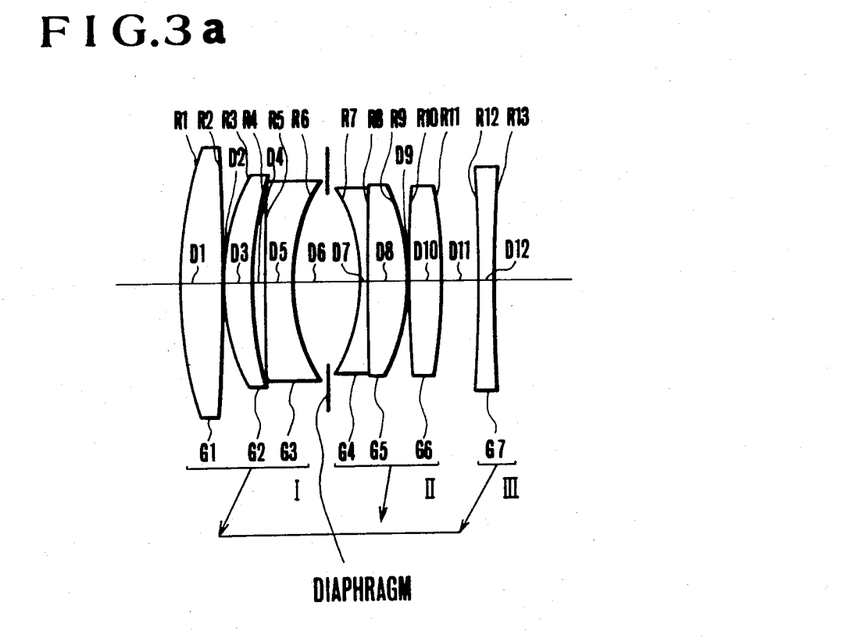
Figure 3B:
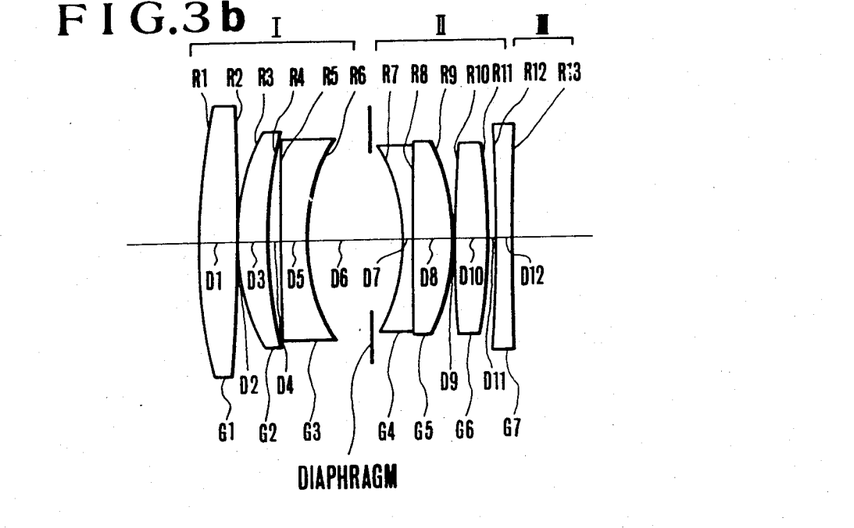
Figure 4A:
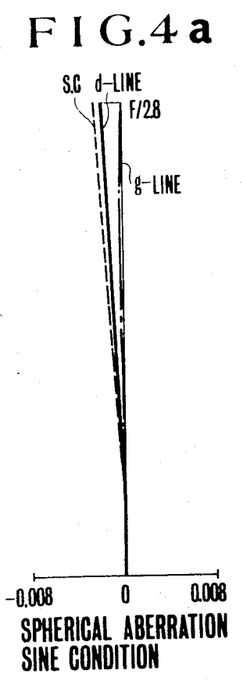
Figure 4B:
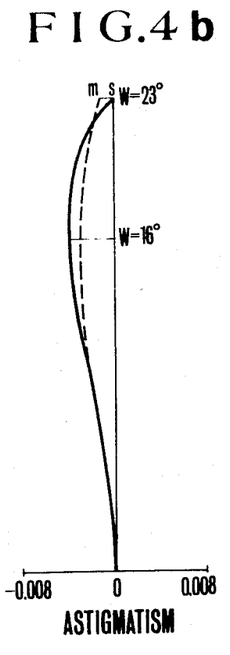
Figure 4C:
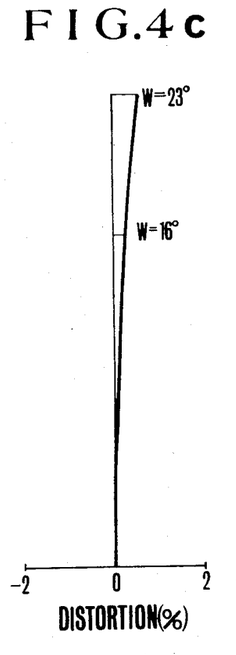
Figure 4D:
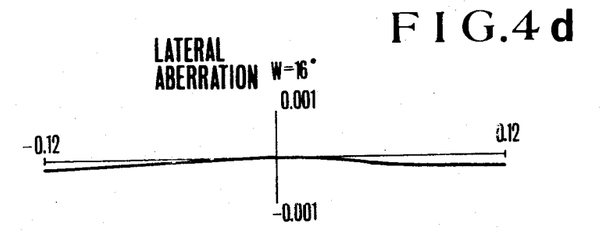
Figure 5A:
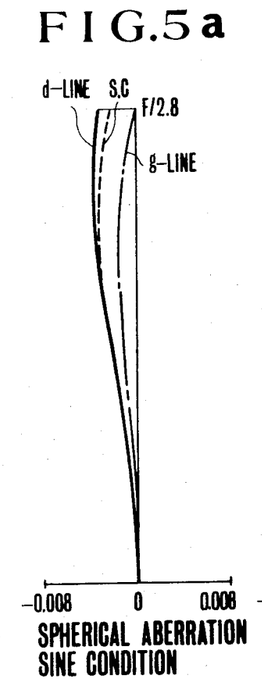
Figure 5B:
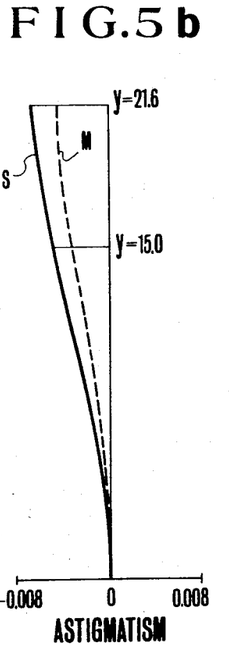
Figure 5C:
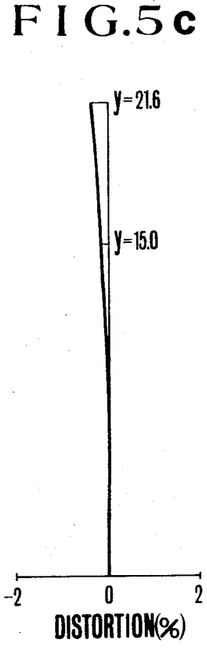
Figure 5D:
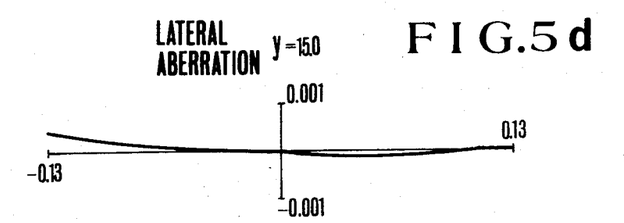
Figure 6A:
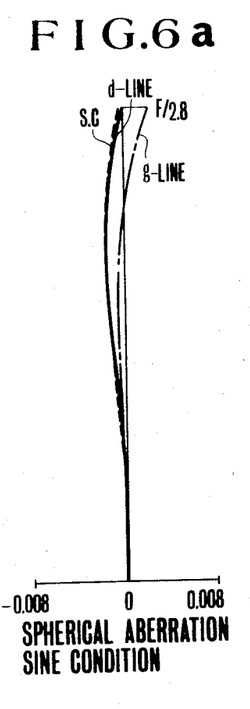
Figure 6B:
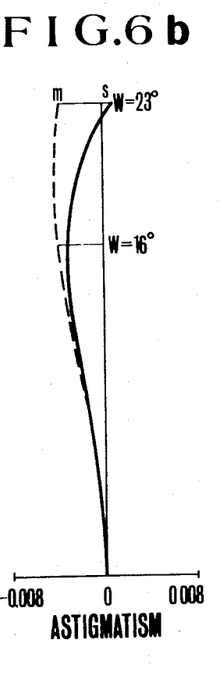
Figure 6C:
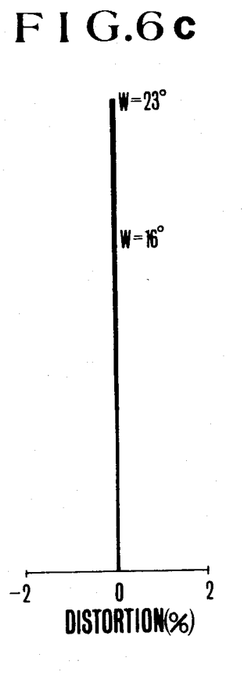
Figure 6D:
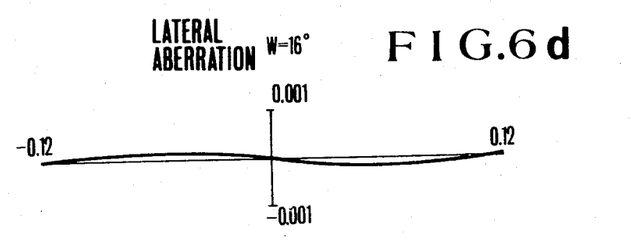
Figure 7A:
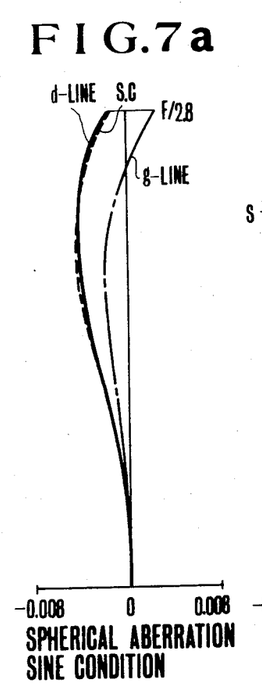
Figure 7B:
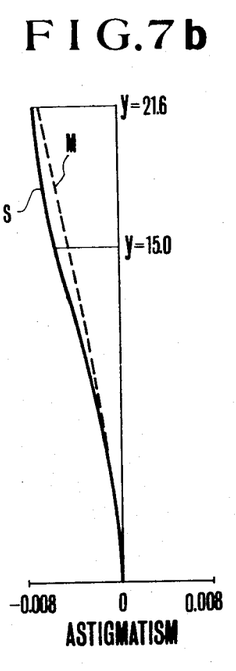
Figure 7C:
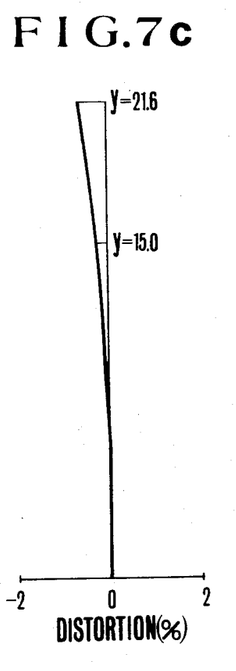
Figure 7D:
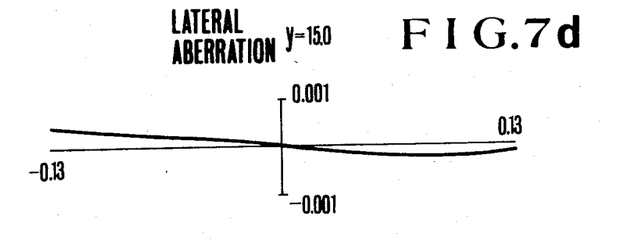
Figure 8A:
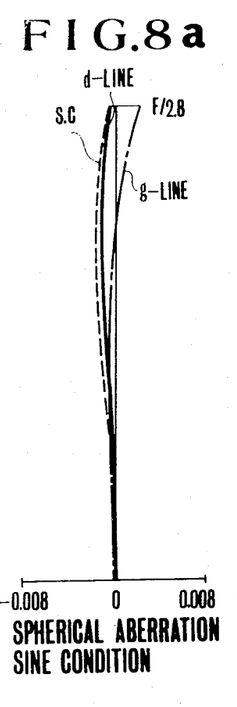
Figure 8B:
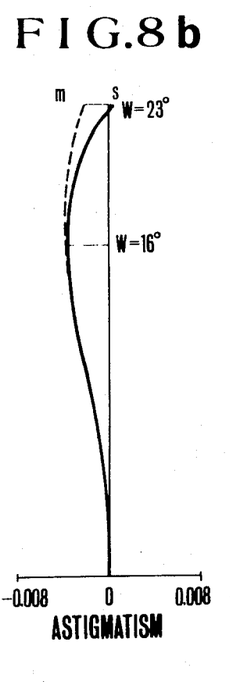
Figure 8C:
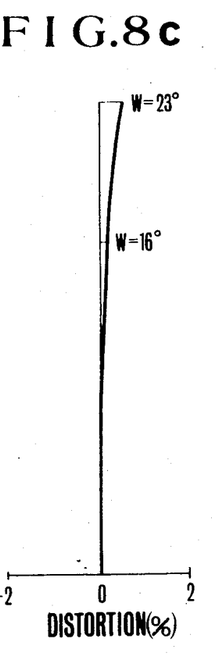
Figure 8D:
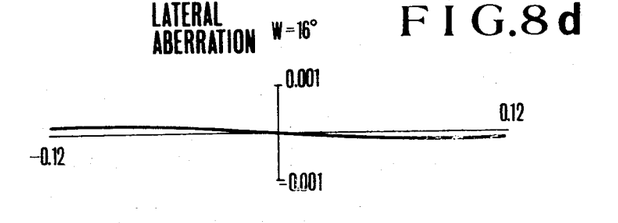
Figure 9A:
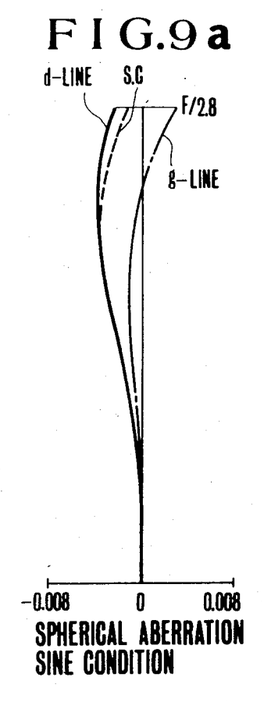
Figure 9B:
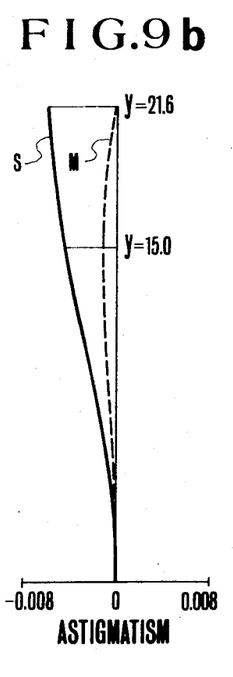
Figure 9C:
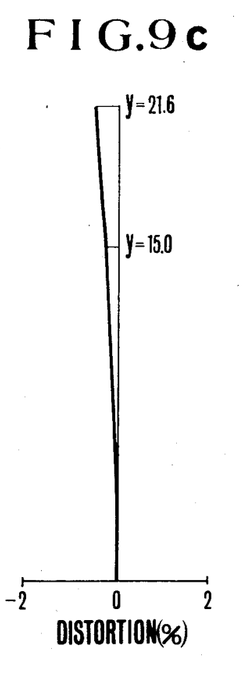
Figure 9D:
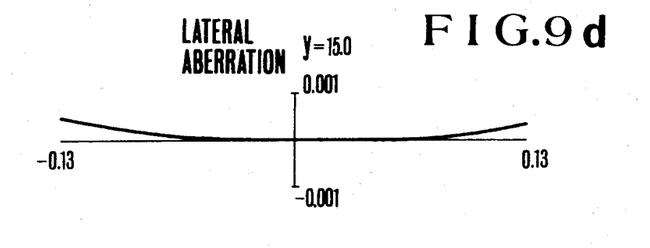

In FIGS. 1 to 3 there are shown three embodiments of objectives according to the present invention. The objectives each comprise, from front to rear, a bi-convex or positive lens, or positive meniscus lens G1 of forward convexity, a positive meniscus lens G2 of forward convexity, a negative meniscus lens G3 of forward convexity, a doublet lens G5' consisting of a negative lens G4 and a positive lens G5 cemented together with its rear surface convex toward the rear, a positive lens G6 and a negative lens G7. The positive lens G1, positive meniscus lens G2 and negative meniscus lens G3 constitute a first lens component of positive power. The lens G5' and positive lens G6 constitute a second lens component of positive power. The negative lens G7 constitutes a third lens component of negative power. And positioned in a space between the first and second lens components is a diaphragm.

The floating method of the invention is characterized in that the first and third lens components are moved axially forward while the second lens component is simultaneously moved axially forward but by a smaller amount that that of movement of the first and third lens components, when focusing is effected down from infinity to shorter object distances. In other words, the first lens component is moved away from the second lens component to widen the air separation in which the diaphragm is located, and instead the second lens component approaches the third lens component by the widened portion of the separation. The use of this floating method makes it possible to lessen the variation of the principal point interval which in turn lessens the amount of variation of the focal length. A further advantage is that when closeup photography is performed, as the principal ray of the extra-axial pencil makes a smaller angle with the optical axis, though outward coma is often produced, this can be cancelled out by inward coma resulting from the strong refraction of the extra-axial pencil by the second lens component, for the diaphragm space is widened.

Further, since the second lens component, after having floated, lies nearer to the third lens component, the paraxial pencil is incident upon the third lens component at a higher height. Therefore the negative refracting action causes over-correction of spherical aberration. Thus, the residual spherical aberration, which would otherwise tend to be under-corrected when in closeup photography, can be well compensated for.

The diaphragm may be allowed to follow up any one of the first and second lens components, provided that the diaphragm space is widened.

The floating method of the invention has features which can facilitate an improvement of the image quality in closeup photography. To achieve a further improvement of the image quality, it is desirable to set forth the following conditions: That is, letting f denote the focal length of the entire system, f1, f2 and f3 the focal lengths of the first, second and third lens components respectively, $\Delta d$ the amount of variation of the air separation between the first and second lens components when focusing is effected down from infinity to shorter object distances, and $\Delta s$ the amount of forward movement of the first and third lens components, $$2.8f < f_1 < 3.1f \tag{1}$$

$$0.9f < f_2 < 1.1f \tag{2}$$

$$3.6f < |f_3| < 9.5f;\ f_3 < 0 \tag{3}$$

$$0.06 < \Delta d/\Delta s < 0.12 \tag{4}$$

are satisfied.

Condition (1) is for determining the power of the first lens component so that, in closeup photography, the paraxial pencil does not have a large diverging tendency near the position of the diaphragm, but is made to be an almost parallel pencil. This leads to the achievement of good correction of spherical aberration throughout an extended range of image magnifications. Further, it assists in establishing a proper configuration of the lens system and achieving a good imaging performance over the entire area of the picture frame. When the upper limit of inequalities (1) is exceeded, as the paraxial pencil diverges near the diaphragm, spherical aberration is under-corrected in close up photography. When the lower limit is exceeded, the sufficiently long back focus cannot be obtained.

Condition (2) is concerned with the refractive power of the second lens group and in conjunction with condition (4) is for good correction of outward coma produced in close up photography without the necessity of much increase in the refractive power of the first lens component and further for preventing the range of floating movement of the second lens component from being largely increased. When the lower limit of inequalities (2) is exceeded, under-correction of outward coma results, and also the range of floating movement of the 2nd lens group is increased so that it is required to widen the lens separation by this excess amount with a disadvantage that the bulk and size of the complete objective is unduly increased. When the upper limit is exceeded, the floating effect by the second lens component is strengthened, but large spherical aberration is produced, which is difficult to correct.

Condition (3) represents the choice of a proper value for the focal length of the third lens component and is for minimizing the variation of the focal length of the entire lens system with focusing regardless of the floating which is prominent when in close up photography and further for good correction of spherical aberration. When the upper limit of inequalities (3) is exceeded, outward coma and spherical aberration are under-corrected. When the lower limit is exceeded, halo in the marginal zone of the extra-axial pencil is increased with some loss in aberration correction.

Condition (4) is concerned with the floating of each of the lens groups for the purpose of good correction of the various aberrations when in close up photography under the framework of conditions (2) and (3). When the lower limit of inequalities (4) is exceeded, correction of outward coma by the floating of the lens groups is not sufficient. When the upper limit is exceeded, the symmetry of the lens configuration is broken to produce asymmetrical aberrations, and the total length of the objective is elongated.

Though the objects of the invention can be accomplished by the above-stated features, in order to achieve a further improvement of the picture quality, it is preferable to dimension each lens group to comply with the following conditions. Letting Ri be the radius of curvature of the i-th lens surface counting from the front, and Ni and $\nu i$ the refractive index and Abbe number of the glass of the i-th lens element counting from the front, the additional conditions given are the following:

$$1.75 < N6 \tag{5}$$

$$-1.25 < (R11+R10)/(R11-R10) < -0.65 \tag{6}$$

$$2.5 < R5/R4 < 15.0 \tag{7}$$

$$50 < \nu 7 \tag{8}$$

These conditions are explained below. Condition (5) is concerned with the refractive index of the glass material of which the sixth lens element of positive power, counting from the front, is made up, and, upon cooperation with condition (6) strengthens the refractive power of the second lens component to facilitate good correction of outward coma. When the refractive index is higher than 1.75, the second lens component can be imparted with the desired refractive power, and, without recourse to a manufacturing-difficult lens form, it is possible to correct the various aberrations with ease.

Condition (6) is for suppressing distortion and taking a sufficiently long back focus under the condition of the limitation of the refractive index by inequality (5). When the lower limit is exceeded, coma is deteriorated badly as the angular field of view increases. When the upper limit is exceeded, negative distortion is increased objectionably.

Condition (7) is for generally correcting aberrations in the lens system having a relative aperture of about 2.8. In general, as the relative aperture increases, the back focus tends to shorten. To compensate for this, it is effective to provide a diverging portion in the 1st lens group. For this purpose, the air separation between the positive meniscus lens G2 and the negative meniscus lens G3 is made to bear a portion of the diverging action. When the lower limit of inequalities (7) is exceeded, spherical aberration and astigmatism are undercorrected, and the Petzval sum also increases. On the other hand, the nearer to the upper limit, the factor, the stronger the negative refractive power of the air lens defined by the rear surface R4 of the positive meniscus lens G2 and the front surface R5 of the negative meniscus lens G3 becomes. Then, when the upper limit is exceeded, the divergency becomes too strong to avoid the difficulty of correcting coma and, when in closeup photography, spherical aberration.

Condition (8) is concerned with the dispersion of the glass of the negative lens G7. In the floating method of the invention, when focusing is effected to shorter object distances, the floating lens group lies as near to the third lens component as possible. Therefore, even when the first lens group is made achromatic, the choice of a glass having a large dispersion for the negative lens G7 will result in the production of color halo aberrations due to the difference of the wavelengths in the marginal zone of the off-axis pencil. Condition (8) is for good correction of this. When condition (8) is violated, color halo aberrations become prominent.

The constructional data of specific embodiments according to the present invention are given in the following tables for the radii of curvature, R, the axial thicknesses and axial air separations, D, and the refractive indices, N, and Abbe numbers, $\nu$, of the glass materials of the various lens elements.

| Embodiment 1 | | | | | |
|---|---|---|---|---|---|
| Focal Length f = 1.0 | F-number 1:2.8 | Image Angle 2ω = 46° | | | |
| $R_1$ = 1.0374 | $D_1$ = 0.0441 | $N_1$ = 1.60311 | $\nu_1$ = 60.7 | | |
| $R_2$ = −3.1766 | $D_2$ = 0.0029 | | | | |
| $R_3$ = 0.3886 | $D_3$ = 0.0509 | $N_2$ = 1.69680 | $\nu_2$ = 55.5 | | |
| $R_4$ = 0.8124 | $D_4$ = 0.0292 | | | | |
| $R_5$ = 11.6038 | $D_5$ = 0.0783 | $N_3$ = 1.59551 | $\nu_3$ = 39.2 | | |
| $R_6$ = 0.3103 | $D_6$ = 0.1105 | | | | |
| $R_7$ = −0.3637 | $D_7$ = 0.0198 | $N_4$ = 1.59270 | $\nu_4$ = 35.3 | | |
| $R_8$ = 2.8878 | $D_8$ = 0.0768 | $N_5$ = 1.69680 | $\nu_5$ = 55.5 | | |
| $R_9$ = −0.5946 | $D_9$ = 0.0029 | | | | |
| $R_{10}$ = −4.8265 | $D_{10}$ = 0.0438 | $N_6$ = 1.77250 | $\nu_6$ = 49.6 | | |
| $R_{11}$ = −0.5267 | $D_{11}$ = 0.0399 | | | | |
| $R_{12}$ = −0.5765 | $D_{12}$ = 0.0297 | $N_7$ = 1.51633 | $\nu_7$ = 64.1 | | |
| $R_{13}$ = −0.6648 | | | | | |

| Embodiment 2 | | | | |
|---|---|---|---|---|
| Focal Length f = 1.0 | F-number 1:2.8 | Image Angle 2ω = 46° | | |
| $R_1$ = 0.7052 | $D_1$ = 0.0736 | $N_1$ = 1.58913 | $\nu_1$ = 61.0 | |
| $R_2$ = 33.4091 | $D_2$ = 0.0029 | | | |
| $R_3$ = 0.3613 | $D_3$ = 0.0487 | $N_2$ = 1.75700 | $\nu_2$ = 47.9 | |
| $R_4$ = 0.5766 | $D_4$ = 0.0232 | | | |
| $R_5$ = 1.4925 | $D_5$ = 0.0320 | $N_3$ = 1.58921 | $\nu_3$ = 41.1 | |
| $R_6$ = 0.2860 | $D_6$ = 0.1432 | | | |
| $R_7$ = −0.2726 | $D_7$ = 0.0157 | $N_4$ = 1.78472 | $\nu_4$ = 25.7 | |
| $R_8$ = −0.7449 | $D_8$ = 0.0747 | $N_5$ = 1.72000 | $\nu_5$ = 50.2 | |
| $R_9$ = −0.3286 | $D_9$ = 0.0029 | | | |
| $R_{10}$ = 8.2987 | $D_{10}$ = 0.0420 | $N_6$ = 1.80610 | $\nu_6$ = 40.9 | |
| $R_{11}$ = −0.6996 | $D_{11}$ = 0.0805 | | | |
| $R_{12}$ = 9.6899 | $D_{12}$ = 0.0290 | $N_7$ = 1.51633 | $\nu_7$ = 64.1 | |
| $R_{13}$ = 1.9490 | | | | |

| Embodiment 3 | | | | |
|---|---|---|---|---|
| Focal Length f = 1.0 | F-number 1:2.8 | Image Angle 2ω = 46° | | |
| $R_1$ = 0.8599 | $D_1$ = 0.0666 | $N_1$ = 1.60311 | $\nu_1$ = 60.7 | |
| $R_2$ = −9.5270 | $D_2$ = 0.0029 | | | |
| $R_3$ = 0.3506 | $D_3$ = 0.0503 | $N_2$ = 1.71300 | $\nu_2$ = 53.8 | |
| $R_4$ = 0.6451 | $D_4$ = 0.0203 | | | |
| $R_5$ = 2.5734 | $D_5$ = 0.0484 | $N_3$ = 1.60717 | $\nu_3$ = 40.3 | |
| $R_6$ = 0.2974 | $D_6$ = 0.1159 | | | |
| $R_7$ = −0.2917 | $D_7$ = 0.0156 | $N_4$ = 1.62588 | $\nu_4$ = 35.7 | |
| $R_8$ = −8.9730 | $D_8$ = 0.0667 | $N_5$ = 1.69100 | $\nu_5$ = 54.8 | |
| $R_9$ = −0.3475 | $D_9$ = 0.0029 | | | |
| $R_{10}$ = 4.1448 | $D_{10}$ = 0.0557 | $N_6$ = 1.77250 | $\nu_6$ = 49.6 | |
| $R_{11}$ = −0.8778 | $D_{11}$ = 0.0577 | | | |
| $R_{12}$ = −3.8759 | $D_{12}$ = 0.0310 | $N_7$ = 1.51633 | $\nu_7$ = 64.1 | |
| $R_{13}$ = 3.8759 | | | | |

What is claimed is:

1. An objective lens of large relative aperture satisfying the following various conditions:
   having three lens components, from front to rear,
   the first lens component having a positive refractive power,
   the second lens component having a positive refractive power,
   the third lens component having a negative refractive power,
   the first lens component and the third lens component being moved axially forward, while the second lens component is moved axially forward by a lesser amount than that of movement of the first lens component and the third lens component to effect focusing from infinity to shorter object distances,
   letting f denote the focal length of the entire system, $f_1$, $f_2$ and $f_3$ the focal lengths of the first and second components and third lens component respectively, $\Delta d$ the amount of variation of the air separation between the first lens component and the second lens component when focusing is effected from infinity to shorter object distances, and $\Delta s$ the amount of forward movement of the first lens component and third lens component, $2.8f < f_1 < 3.1f$ $0.9f < fHd\ 2 < 1.1f$ $3.6f < |f_3| < 9.5f;\ f_3 < 0$ $0.06 < \Delta d/\Delta s < 0.12$ are satisfied.

2. A large relative aperture objective lens according to claim 1, wherein said first lens component has, from front to rear, a positive lens, a positive meniscus lens of convex curvature towards the front, and a negative meniscus lens of convex curvature towards the front, said second lens component being a floating lens component having a cemented lens of a negative lens and a positive lens, and a positive lens, and said third lens component has a negative lens, whereby letting Ri the radius of curvature of the i-th lens surface counting from the front, and Ni and $\nu$i the refractive index and Abbe number of the glass material of the i-th lens element counting from the front respectively, the following conditions are satisfied:

$1.75 < N_6$ $-1.25 < (R_{11} + R_{10})/(R_{11} - R_{10}) < -0.65$ $2.5 < R_5/R_4 < 15$ $50 < \nu_7$

* * * * *